(12) United States Patent
Patel et al.

(10) Patent No.: US 9,551,191 B2
(45) Date of Patent: Jan. 24, 2017

(54) METHODS OF FORMING DOWNHOLE TOOLS HAVING FEATURES FOR REDUCING BALLING

(71) Applicant: Baker Hughes Incorporated, Houston, TX (US)

(72) Inventors: Suresh G. Patel, The Woodlands, TX (US); Chaitanya K. Vempati, Conroe, TX (US); Steven R. Radford, The Woodlands, TX (US); Timothy K. Marvel, The Woodlands, TX (US); Bruce Stauffer, Spring, TX (US); George I. Butler, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 47 days.

(21) Appl. No.: 14/656,080

(22) Filed: Mar. 12, 2015

(65) Prior Publication Data

US 2015/0184463 A1    Jul. 2, 2015

Related U.S. Application Data

(62) Division of application No. 13/006,323, filed on Jan. 13, 2011, now Pat. No. 8,985,244.

(Continued)

(51) Int. Cl.
*E21B 10/43*    (2006.01)
*E21B 10/54*    (2006.01)
(Continued)

(52) U.S. Cl.
CPC ............. *E21B 10/54* (2013.01); *B23P 15/28* (2013.01); *B23P 15/32* (2013.01); *E21B 10/42* (2013.01);
(Continued)

(58) Field of Classification Search
CPC .......... E21B 10/42; E21B 10/43; E21B 10/46; E21B 10/54; E21B 17/1085
See application file for complete search history.

(56) References Cited

U.S. PATENT DOCUMENTS 3,818,996 A    6/1974  McCaleb
5,330,016 A    7/1994  Paske et al.
(Continued)

FOREIGN PATENT DOCUMENTS

| WO | 0013807 A1 | 3/2000 |
|----|------------|--------|
| WO | WO03029604 A1 | 4/2003 |
| WO | 2008099220 A2 | 8/2008 |

OTHER PUBLICATIONS

Communication and Supplemental European Search Report for European Application No. EP11151060.8 dated Jun. 5, 2014, 7 pages.

(Continued)

*Primary Examiner* — Catherine Loikith
(74) *Attorney, Agent, or Firm* — TraskBritt

(57) ABSTRACT

Downhole tools with a topographical pattern, and anti-balling material over the topographical pattern. The topographical pattern may be defined by at least one of a plurality of recesses extending into a surface of a body of the tool and a plurality of protrusions protruding from the surface. Downhole tools include an insert disposed within a recess in a body, and the insert comprises an anti-balling material having a composition selected to reduce accumulation of formation cuttings on the tools when the tools are used to form or service a wellbore. Downhole tools include anti-balling material disposed over a porous mass provided over the surfaces of the tools. Methods of forming downhole tools include providing anti-balling material over features on and/or in a surface of a body of a tool. Methods of repairing (Continued)

downhole tools include removing an insert therefrom and disposing a replacement insert therein.

20 Claims, 12 Drawing Sheets

Related U.S. Application Data

(60) Provisional application No. 61/295,989, filed on Jan. 18, 2010.

(51) Int. Cl.
  *E21B 10/46* (2006.01)
  *E21B 17/10* (2006.01)
  *B23P 15/32* (2006.01)
  *E21B 10/42* (2006.01)
  *B23P 15/28* (2006.01)

(52) U.S. Cl.
  CPC ........... *E21B 10/46* (2013.01); *E21B 17/1085* (2013.01); *Y10T 29/49734* (2015.01); *Y10T 29/49982* (2015.01)

(56) References Cited

U.S. PATENT DOCUMENTS

| | | |
|---|---|---|
| 5,509,490 A | 4/1996 | Paske et al. |
| 5,542,486 A | 8/1996 | Curlett et al. |
| 5,651,420 A | 7/1997 | Tibbitts et al. |
| 6,260,636 B1 | 7/2001 | Cooley et al. |
| 6,328,117 B1 | 12/2001 | Berzas et al. |
| 6,450,271 B1 | 9/2002 | Tibbitts et al. |
| 6,651,756 B1 | 11/2003 | Costo, Jr. et al. |
| 7,237,628 B2 | 7/2007 | Desai et al. |
| 7,395,882 B2 | 7/2008 | Oldham et al. |
| 2008/0029310 A1 | 2/2008 | Stevens et al. |
| 2011/0079438 A1 | 4/2011 | Schwefe et al. |
| 2011/0174548 A1 | 7/2011 | Patel et al. |
| 2012/0205162 A1 | 8/2012 | Patel et al. |

OTHER PUBLICATIONS merriam-webster.com, pattern, available at http://www.merriam-webster.com/dictionary/pattern, accessed Jul. 24, 2014.

METHODS OF FORMING DOWNHOLE TOOLS HAVING FEATURES FOR REDUCING BALLING

CROSS-REFERENCE TO RELATED APPLICATIONS

This application is a divisional of U.S. patent application Ser. No. 13/006,323, filed Jan. 13, 2011, now U.S. Pat. No. 8,985,244, issued Mar. 24, 2015, which application claims the benefit of U.S. Provisional Patent Application Ser. No. 61/295,989, filed Jan. 18, 2010, titled "Drill Bits and Other Downhole Tools Having Features for Reducing Balling, and Related Methods." The subject matter of this application is also related to the subject matter of U.S. patent application Ser. No. 13/454,865, filed Apr. 24, 2012, now U.S. Pat. No. 9,157,283, issued Oct. 13, 2015, titled "Downhole Tools Having Features for Reducing Balling, and Methods of Forming Such Tools," which application is a continuation of U.S. patent application Ser. No. 13/006,323. The disclosures of each of these applications are incorporated in their entirety herein by this reference.

TECHNICAL FIELD

Embodiments of the present invention relate to downhole tools, such as earth-boring rotary drill bits, and, more particularly, to downhole tools having features for reducing the adhesion of formation cuttings thereto during the formation of a wellbore, and to methods of forming such downhole tools.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Often various tools and components, including the drill bit, may be coupled together at the distal end of the drill string at the bottom of the wellbore being drilled. This assembly of tools and components is referred to in the art as a "bottom hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

It is known in the art to use what are referred to in the art as "reamer" devices (also referred to in the art as "hole opening devices" or "hole openers") in conjunction with a drill bit as part of a bottom hole assembly when drilling a wellbore in a subterranean formation. In such a configuration, the drill bit operates as a "pilot" bit to form a pilot bore in the subterranean formation. As the drill bit and bottom hole assembly advances into the formation, the reamer device follows the drill bit through the pilot bore and enlarges the diameter of, or "reams," the pilot bore.

The bodies of downhole tools, such as drill bits and reamers, are often provided with fluid courses, such as "junk slots," to allow drilling mud (which may include drilling fluid and formation cuttings generated by the tools that are entrained within the fluid) to pass upwardly around the bodies of the tools into the annular space within the wellbore above the tools outside the drill string. Drilling tools used for casing and liner drilling usually have smaller fluid courses and are particularly prone to balling, causing a lower rate of penetration.

When drilling a wellbore, the formation cuttings may adhere to, or "ball" on, the surface of the drill bit. The cuttings may accumulate on the cutting elements and the surfaces of the drill bit or other tool, and may collect in any void, gap, or recess created between the various structural components of the bit. This phenomenon is particularly enhanced in formations that fail plastically, such as in certain shales, mudstones, siltstones, limestones and other relatively ductile formations. The cuttings from such formations may become mechanically packed in the aforementioned voids, gaps, or recesses of the drill bit. In other cases, such as when drilling certain shale formations, the adhesion between formation cuttings and a surface of a drill bit or other tool may be at least partially based on chemical bonds therebetween. When a surface of a drill bit becomes wet with water in such formations, the bit surface and clay layers of the shale may share common electrons. A similar sharing of electrons is present between the individual sheets of the shale itself. A result of this sharing of electrons is an adhesive-type bond between the shale and the bit surface. Adhesion between the formation cuttings and the bit surface may also occur when the charge of the bit face is opposite the charge of the formation. The oppositely charged formation particles may adhere to the surface of the bit. Moreover, particles of the formation may be compacted onto surfaces of the bit or mechanically bonded into pits or trenches etched into the bit by erosion and abrasion during the drilling process.

In some cases, drilling operations are conducted with reduced or mitigated hydraulics. For example, some rigs may not have large pumps for drilling to the depths required. Furthermore, operators sometimes find it too costly to run higher mud flow rates or find that high flow rates cause more wear and tear to the BHA. Drilling with reduced or mitigated hydraulics has a tendency to cause balling.

Attempts have been made to reduce the likelihood of balling in downhole tools, as disclosed in, for example, U.S. Pat. No. 5,651,420, which issued Jul. 29, 1997, to Tibbitts et al., and U.S. Pat. No. 6,260,636, which issued Jul. 17, 2001, to Cooley et al.; and U.S. Pat. No. 6,450,271, which issued Sep. 17, 2002, to Tibbitts et al.

BRIEF SUMMARY

In some embodiments, the present invention includes a downhole tool with a body having a surface with a topographical pattern defined by at least one of a recess extending into the surface and a protrusion protruding from the surface. The tool also includes an anti-balling material disposed over at least a portion of the surface comprising the pattern. The anti-balling material may have a composition selected to reduce accumulation of formation cuttings thereon when the downhole tool is used to form or service a wellbore.

In certain embodiments, a downhole tool may include a body having a surface having at least one recess extending into the surface of the body and an insert disposed within the at least one recess. The insert may comprise an anti-balling material having a composition selected to reduce accumulation of formation cuttings thereon when the downhole tool is used to form or service a wellbore.

In some embodiments, a downhole tool may include a body having a surface, at least one porous mass over the surface of the body; and an anti-balling material disposed over the at least one porous mass. The anti-balling material may have a composition selected to reduce accumulation of formation cuttings thereon when the downhole tool is used to form or service a wellbore.

Methods of forming a downhole tool may include forming at least one of a recess extending into a body of the downhole tool and a protrusion protruding from the body of the downhole tool. Methods may further include providing an anti-balling material over at least a portion of the surface and selecting the anti-balling material to have a composition for reducing accumulation of formation cuttings thereon when the downhole tool is used to form or service a wellbore. The downhole tool may include a surface that extends into or over the recess or protrusion.

Methods of forming a downhole tool may include providing a porous mass over a surface of a body of the downhole tool, providing an anti-balling material over at least a portion of the porous mass, and selecting the anti-balling material to have a composition for reducing accumulation of formation cuttings thereon when the downhole tool is used to form or service a wellbore.

Methods of forming a downhole tool may also include forming a recess in a surface of a body of the downhole tool, forming an insert comprising an anti-balling material, selecting the anti-balling material to have a composition for reducing accumulation of formation cuttings thereon when the downhole tool is used to form or service a wellbore, disposing the insert within the recess, and attaching the insert to the body of the downhole tool.

Methods of repairing a downhole tool may include removing an insert from a recess of the downhole tool, disposing a replacement insert within the recess, and attaching the replacement insert to the body of the downhole tool. The replacement insert may have an anti-balling material selected to have a composition for reducing accumulation of formation cuttings thereon when the downhole tool is used to form or service a wellbore.

BRIEF DESCRIPTION OF THE DRAWINGS

While the specification concludes with claims particularly pointing out and distinctly claiming what are regarded as embodiments of the present invention, various features and advantages of this invention may be more readily ascertained from the following description of example embodiments of the invention provided with reference to the accompanying drawings, in which:

DETAILED DESCRIPTION

The illustrations presented herein are not actual views of any particular downhole tool, drill bit, or component of such a tool or bit, but are merely idealized representations which are employed to describe embodiments of the present invention.

Figure 1:
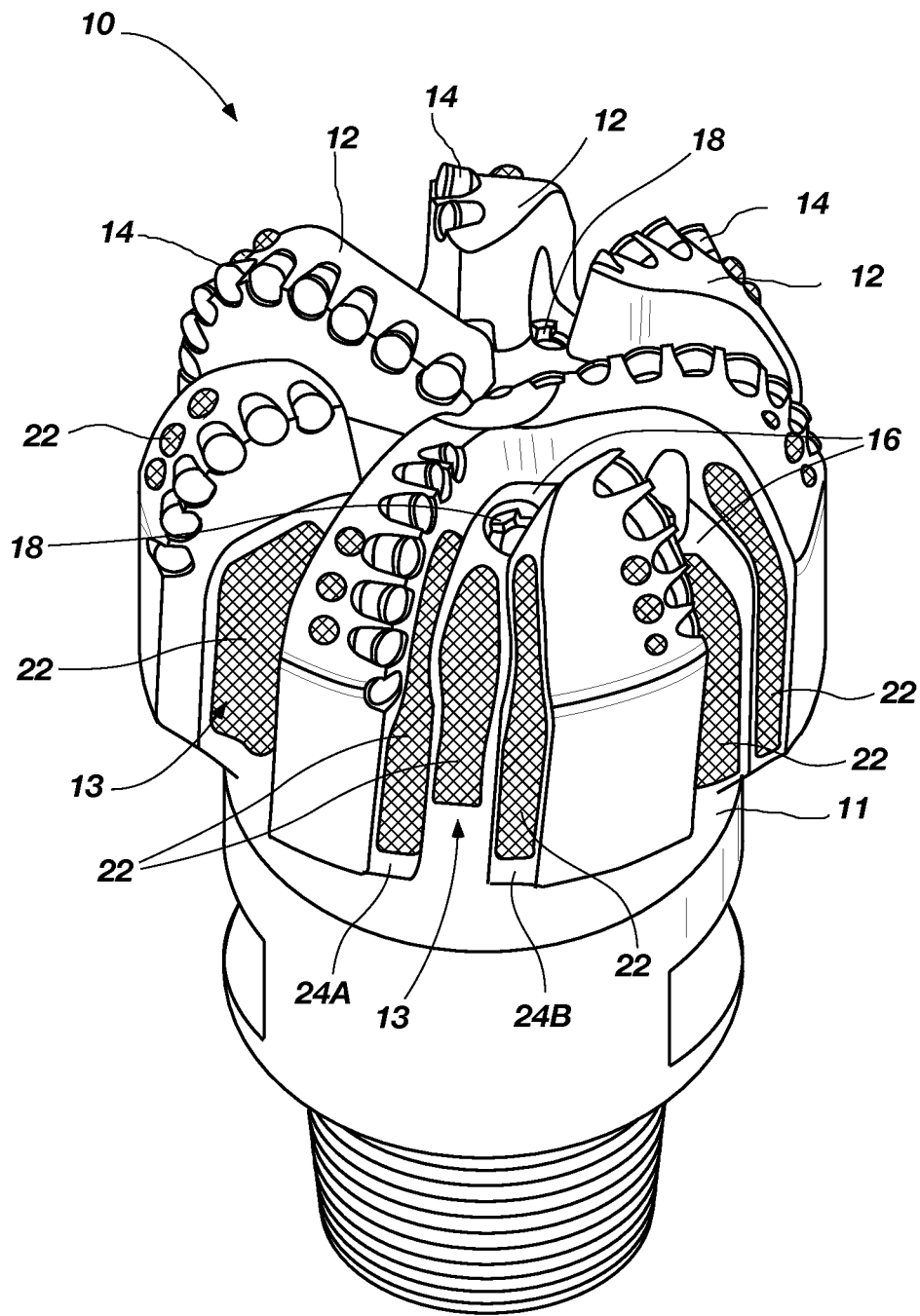
FIG. 1 is a perspective view of an embodiment of a downhole tool of the present invention, which includes an anti-balling material attached thereto using features and methods described herein.

FIG. 1 illustrates an embodiment of a downhole tool of the present invention. The downhole tool of FIG. 1 is an earth-boring rotary drill bit 10 having a bit body 11 that includes a plurality of blades 12 separated from one another by fluid courses 13. The portions of the fluid courses 13 that extend along the radial sides (the "gage" areas of the drill bit 10) are often referred to in the art as "junk slots." A plurality of cutting elements 14 are mounted to each of the blades 12. The bit body 11 further includes a generally cylindrical internal fluid plenum and fluid passageways that extend through the bit body 11 to an exterior surface 16 of the bit body 11. Nozzles 18 may be secured within the fluid passageways proximate the exterior surface 16 of the bit body 11 for controlling the hydraulics of the drill bit 10 during drilling.

During a drilling operation, the drill bit 10 may be coupled to a drill string (not shown). As the drill bit 10 is rotated within the wellbore, drilling fluid may be pumped down the drill string, through the internal fluid plenum and fluid passageways within the bit body 11 of the drill bit 10, and out from the drill bit 10 through the nozzles 18. Formation cuttings generated by the cutting elements 14 of the drill bit 10 may be carried with the drilling fluid through the fluid courses 13, around the drill bit 10, and back up the wellbore through the annular space within the wellbore and outside the drill string.

As shown in FIG. 1, an anti-balling material 22, which is represented in FIG. 1 by the cross-hatched areas for purposes of illustration, may be disposed over at least a portion of the exterior surface 16 of the bit body 11. The anti-balling material 22 may have a composition selected to reduce accumulation of formation cuttings thereon when the drill bit 10 is used to form a wellbore. The anti-balling material 22 may be provided at, for example, regions of the drill bit 10 that are susceptible to balling, such as pinch points (e.g., locations at which blades converge), cuttings trajectory points (e.g., locations at which cuttings converge), and bit shank (i.e., where the bit head and threaded pin meet). For example, the anti-balling material 22 may be disposed over one or more regions of the exterior surface 16 of the bit body 11 of the drill bit 10 within the fluid courses 13, as shown in FIG. 1. Such regions may include, for example, rotationally leading surfaces 24A of the blades 12, rotationally trailing surfaces 24B of the blades, under the cutting elements 14 where chip flow occurs, and behind the cutting elements 14. In additional embodiments, the anti-balling material 22 may form a generally continuous coating disposed over at least substantially all exterior surfaces of the bit body 11 of the drill bit 10.

The anti-balling material 22 may comprise, for example, a polymer material such as, for example, a fluoropolymer (e.g., a TEFLON®-based material), a urethane, or an epoxy. In some embodiments, the anti-balling material 22 also may comprise a metal, a metal alloy, or a ceramic, such as an alloy of boron, aluminum, and magnesium. In other embodiments, anti-balling materials may include graphite, molybdenum disulfide, boron nitride, or silicone. For example, the anti-balling material 22 may comprise a mixture of a fluoropolymer and a metal or metal alloy such as, for example, a nickel-based alloy. Anti-balling materials 22 may be selected or formulated based on various properties, such as hydrophobicity, coefficient of friction, ability to bond to a bit body 11, etc. For example, an anti-balling material 22 may be selected that is hydrophobic (i.e., having a contact angle with water droplets greater than 90°, as determined in accordance with ASTM Standard F21-65, 2007, Standard Test Method for Hydrophobic Surface Films by the Atomizer Test, ASTM Intl, West Conshohocken, Pa.) and has a coefficient of friction of about 0.5 or lower (as determined in accordance with ASTM Standard G115-10, Standard Guide for Measuring and Reporting Friction Coefficients, ASTM Int'l, West Conshohocken, Pa.). In some embodiments, the anti-balling material 22 may have a coefficient of friction of about 0.2 or lower. As a further example, if an anti-balling material 22 is a fluoropolymer, the anti-balling material 22 may have a coefficient of friction of about 0.04. In some embodiments, the anti-balling material 22 may have a coefficient of friction below 0.04. Examples of commercially available materials that may be used for the anti-balling material 22 include, for example, those sold by Southwest Impreglon of Humble, Tex., under the names FLUOROSHIELD™ and FLUOROLON®.

In some embodiments, the anti-balling material 22 may comprise diamond or diamond-like carbon (DLC). DLC is an amorphous coating of carbon formulated to have some properties similar to the properties of diamond, such as hardness or chemical stability. DLC contains $sp^3$ hybridized carbon atoms that may be arranged in any combination of cubic and hexagonal lattices. For example, DLC may include tetrahedral amorphous carbon, or ta-C, which consists of only $sp^3$ carbon. DLC may also include fillers, such as hydrogen, $sp^2$ carbon, or metals. DLC coatings have no long-range crystalline order, which may make the coatings more flexible and able to conform to different shapes. DLC coatings may be chosen for their wear resistance, and may have a coefficient of friction against polished steel from about 0.05 to 0.20 (as determined in accordance with ASTM Standard G115-10).

One particularly suitable process for applying a DLC coating is disclosed in PCT International Patent Application Number PCT/GB2008/050102, filed Feb. 15, 2008 and published on Aug. 21, 2008 under International Publication Number WO 2008/099220, a copy of the application being made a part hereof as Appendix A.

The aforementioned coating process has been implemented for certain applications by Diamond Hard Surfaces Ltd. of Northamptonshire, Great Britain. However, the application of the coating process, which results in a coating trademarked as the ADAMANT® coating, has not been suggested for the application of the present disclosure. It is currently believed that a coating known as the ADAMANT® 010 coating, or an even more robust implementation of same, may be especially suitable for use in the application of the present disclosure. The coating process may be conducted at temperatures of 100° C. or less, and coatings of a desired thickness from about 1 µm to about 50 µm thick, depending on the material of the substrate to be coated, may be achieved at temperatures below 200° C. In addition, these coatings exhibit excellent adhesion to the surface of the coated substrate, as well as high conformality and evenness of coverage.

In some embodiments, the anti-balling material 22 may further comprise one or more filler materials such as, for example, whiskers, fibers, particles, etc. As a non-limiting example, in some embodiments, the anti-balling material 22 may comprise one or more of carbon fibers and ceramic particles (e.g., particles of oxide material such as aluminum oxide, zirconium oxide, yttrium oxide, zinc oxide, titanium oxide, tantalum oxide, etc.).

In some embodiments, the anti-balling material 22 may comprise a layer of material having an average thickness $T_A$ (FIG. 3) greater than about 0.13 mm (about 0.005 in), greater than about 0.20 mm (about 0.008 in), or even greater than about 3.175 mm (about 0.125 in). In other embodiments, however, the anti-balling material 22 may comprise a layer of material having an average thickness $T_A$ (FIG. 3) of between a few nanometers (e.g., two nanometers) and about 0.13 mm (about 0.005 in). For example, some anti-balling materials 22 (e.g., DLC coatings or coatings applied by chemical vapor deposition) may have an average thickness $T_A$ of from about 1 micron (0.001 mm) to about 1000 microns (1.0 mm). As another example, an anti-balling material 22 may be formed to have an average thickness $T_A$ of from about 1 micron to about 25 mm. In some embodiments, the anti-balling material 22 may even have an average thickness $T_A$ greater than 25 mm.

In accordance with some embodiments of the present invention, a porous deposit may be provided over the exterior surface 16 of the bit body 11 of the drill bit 10, and the anti-balling material 22 may be disposed over the porous deposit.

Figure 2:
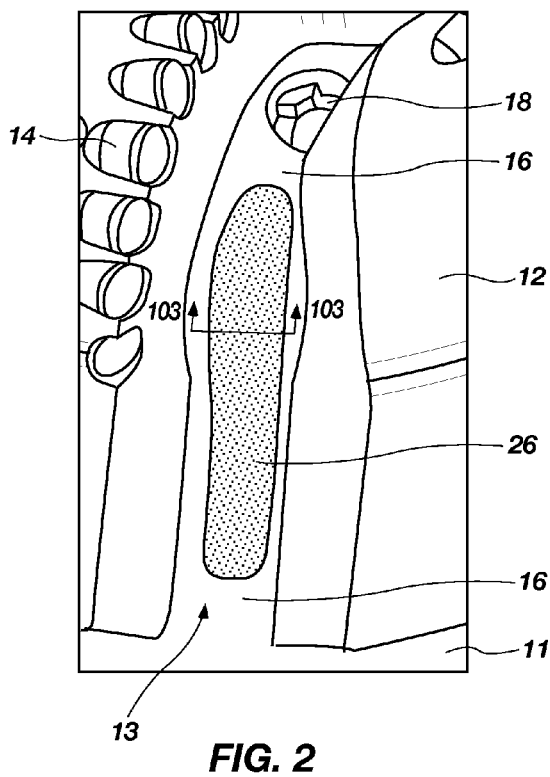
FIG. 2 is an enlarged view of a portion of FIG. 1, and illustrates a texture or pattern on an exterior surface of the tool of FIG. 1 over which the anti-balling material may be disposed.

For example, FIG. 2 is an enlarged view of a portion of the bit body 11 of the drill bit 10 of FIG. 1, and illustrates a porous mass 26 on a region of the exterior surface 16 of the bit body 11 within a fluid course 13. Of course, the porous mass 26 may be provided over any region of the exterior surface 16 of the bit body 11, including the regions of the exterior surface 16 over which the anti-balling material 22 is to be disposed, as previously discussed in relation to FIG. 1.

Figure 3:
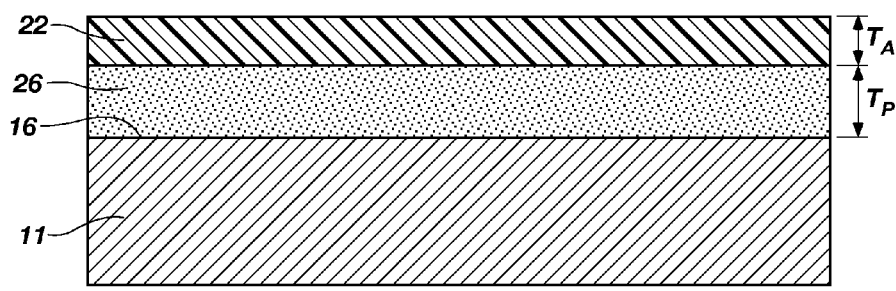
FIG. 3 is a cross-sectional view of a portion of the tool shown in FIGS. 1 and 2, taken along the section line 103-103 shown in FIG. 2.

In the embodiment of FIG. 2, the porous mass 26 includes a substantially continuous layer of porous material that extends over one or more areas of the exterior surface 16 of the bit body 11 of the drill bit 10. FIG. 3 is a cross-sectional view of a portion of the drill bit 10 taken along section line 103-103 shown in FIG. 2. As shown in FIG. 3, the layer of porous material may have an average thickness $T_P$ of between, for example, about 0.0254 mm (about 0.001 in) and about 5.08 mm (about 0.200 in). In certain embodiments, the layer of porous material may have an average thickness $T_P$ of between about 0.13 mm (about 0.005 in) and about 0.20 mm (about 0.008 in).

By way of example and not limitation, the porous mass 26 may comprise a metal or metal-alloy material (such as, for example, steel, nickel alloy, cobalt alloy, or a nickel aluminide) that is deposited over the bit body 11 using a thermal spray process (e.g., a wire arc spray process, chemical vapor deposition, processes for applying DLC coatings, etc.). In such embodiments, relatively fine particles of metal or metal alloy material may be projected out from a spray gun through an arc or flame, where they may become at least partially melted, and onto the exterior surface 16 of the bit body 11. As they impinge on the exterior surface 16, the particles cool, solidify, and are bonded to each other and the underlying exterior surface 16. The inter-particle spaces, however, may not be completely filled and, thus, result in the porosity within the porous mass 26. Wear-resistant particles, such as, for example, tungsten carbide particles, also may be included in the porous mass 26.

After providing the porous mass 26 on the bit body 11, the anti-balling material 22 previously described in relation to FIG. 1 may be provided over the porous mass 26. The anti-balling material 22, when applied to the porous mass 26, may infiltrate into pores of the porous mass 26, which may enhance bonding of the anti-balling material 22 to the bit body 11. The porous mass 26 also may reinforce the anti-balling material 22. Thus, by providing the anti-balling material 22 over the porous mass 26, the rate at which the anti-balling material 22 wears and/or peels away from the bit body 11 during drilling operations may be reduced, and the useful life of the anti-balling material 22 may be increased. In some embodiments, the anti-balling material may be deposited over the porous mass 26 using a thermal spray process.

Figure 4:
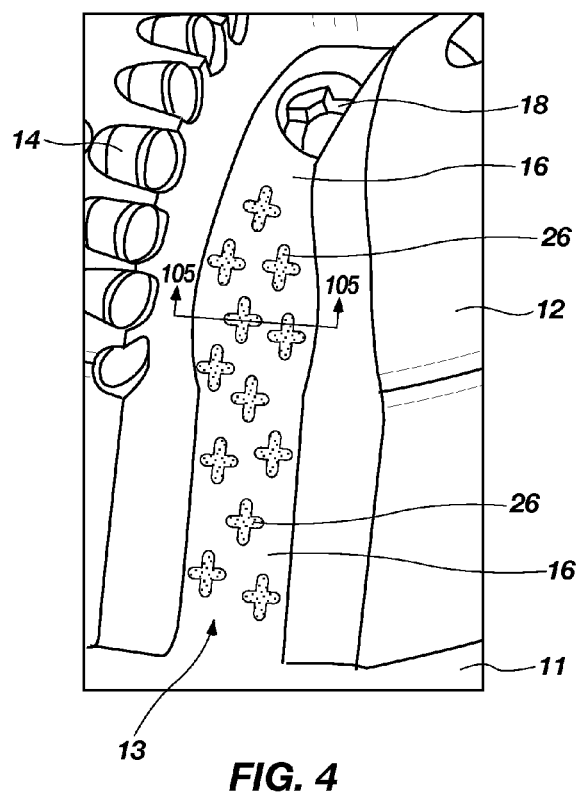
FIG. 4 is similar to FIG. 2, and illustrates another texture or pattern that may be formed on an exterior surface of a tool in accordance with additional embodiments of the present invention for improving adherence of anti-balling material to such tools.

In additional embodiments of the present invention, the porous mass 26 may comprise a plurality of porous masses 26 disposed over one or more regions of the exterior surface 16 of the bit body 11 of the drill bit 10, as shown in FIG. 4. In some embodiments, the plurality of porous masses 26 may define a topographical pattern on the exterior surface 16 of the bit body 11. In some embodiments, the plurality of porous masses 26 may comprise a plurality of discrete, laterally isolated porous masses 26, as shown in FIG. 4. Such discrete porous masses 26 may be disposed in an ordered array over a region of the exterior surface 16 of the bit body 11, such as, for example, in an array of rows and columns. In additional embodiments, the discrete porous masses 26 may be randomly positioned over the exterior surface 16 of the bit body 11. The anti-balling material 22 may extend beyond the discrete porous masses 26, such as in areas prone to balling.

Figure 5:
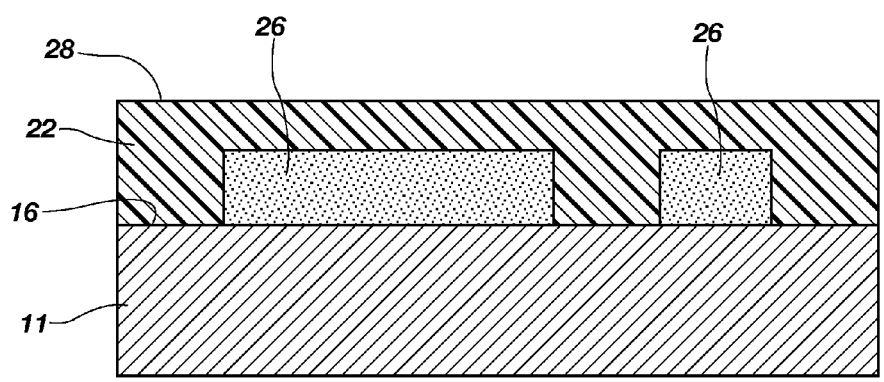
FIG. 5 is a cross-sectional view like that of FIG. 3, and illustrates additional embodiments of the present invention taken along the section line 105-105 shown in FIG. 4.

The plurality of porous masses 26 may have any shape, including, for example, round, oval, square, triangular, or cross-shaped, as shown in FIG. 4. FIG. 5 is a cross-sectional view like that of FIG. 3, but illustrating a plurality of discrete, laterally isolated porous masses 26 on the exterior surface 16 of the bit body 11, and the anti-balling material 22 disposed over the porous masses 26 and the exterior surface 16 of the bit body 11.

As shown in FIG. 5, in some embodiments, an exposed major surface 28 of the anti-balling material 22 over the porous masses 26 may have a smooth contour that does not replicate or follow the contour of the underlying porous masses 26. In other embodiments, however, the exposed major surface 28 may replicate or follow the contour of the underlying porous masses 26, such that the pattern defined by the underlying porous masses 26 is visible from the exterior of the drill bit 10.

The discrete, laterally isolated porous masses 26 may be formed in substantially the same manner, or a substantially similar manner, as the layer of porous material previously described in relation to FIGS. 2 and 3. In a flame spray process, for example, the flame-sprayed material may be deposited onto the bit body 11 through apertures in a mask. The apertures in the mask may have a shape corresponding to the desired shape of the laterally isolated porous masses 26 to be deposited on the exterior surface 16 of the bit body 11.

In accordance with additional embodiments of the present invention, the exterior surface 16 of the bit body 11 of the drill bit 10 may be provided with a topographical pattern that is defined by at least one of a plurality of recesses extending into the exterior surface 16 of the bit body 11, and a plurality of protrusions protruding from the exterior surface 16 of the bit body 11. The anti-balling material 22 may be disposed over the topographical pattern. In other words, the anti-balling material 22 may be disposed over at least a portion of the exterior surface 16 that includes the topographical pattern defined by the recesses and/or protrusions. The topographical pattern may be configured to improve retention of the anti-balling material 22 on the bit body 11 during drilling. In other words, the topographical pattern may be configured to improve the life of the anti-balling material 22 on the bit body 11 of the drill bit 10 during drilling operations.

Figure 6:
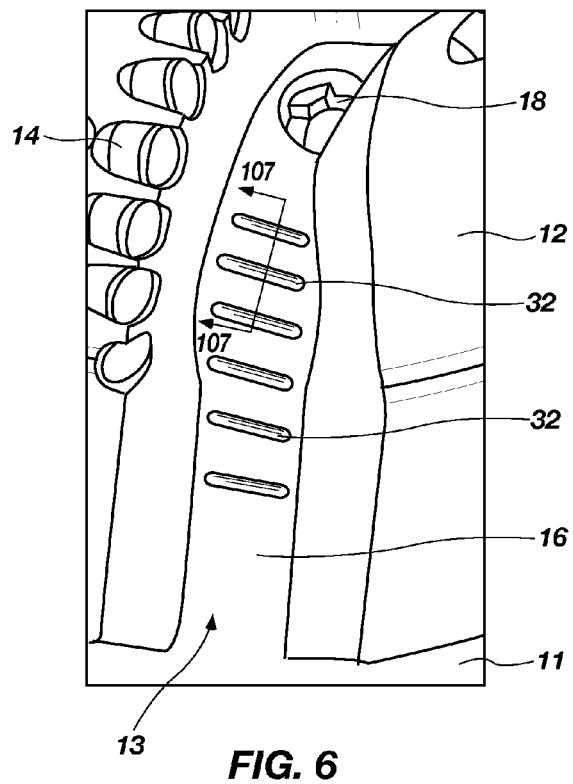
FIG. 6 is similar to FIGS. 2 and 4, and illustrates yet another texture or pattern that may be formed on an exterior surface of a tool in accordance with additional embodiments of the present invention for improving adherence of anti-balling material to such tools.

Referring to FIG. 6, in some embodiments of the invention, recesses 32 (e.g., a plurality of recesses 32) may be formed or otherwise provided in the exterior surface 16 of the bit body 11 of the drill bit 10. As shown in FIG. 6, the recesses 32 may be generally elongated, and, in some embodiments, may be oriented within the fluid course 13 to extend in a direction that is generally transverse to a general direction of fluid flow through the fluid course 13 during a drilling operation. In other embodiments, the recesses 32 may be oriented within the fluid course 13 to extend in a direction that is generally parallel to the general direction of fluid flow through the fluid course 13 during a drilling operation. In yet further embodiments, the recesses 32 may include some recesses 32 oriented transverse to the direction of fluid flow through the fluid course 13, and some recesses 32 oriented parallel to the direction of fluid flow through the fluid course 13. For example, in some embodiments, a plurality of crisscrossing elongated recesses 32 may be provided in a region of the exterior surface 16 within the fluid course 13. In additional embodiments, the recesses 32 may not be elongated, and may have any shape such as, for example, circular, oval, rectangular, square, triangular, etc. Furthermore, in some embodiments, the recesses 32 may comprise a plurality of discrete, laterally isolated recesses 32, as shown in FIG. 6. Such discrete recesses 32 may be disposed in an ordered array over a region of the exterior surface 16 of the bit body 11, or they may be randomly located over the exterior surface 16 of the bit body 11. Thus, the recesses 32 may be used to define or provide a texture or pattern on the exterior surface 16 of the bit body 11, which may improve the usable life of the anti-balling material 22 when the anti-balling material 22 is disposed over the texture or pattern.

Figure 7:
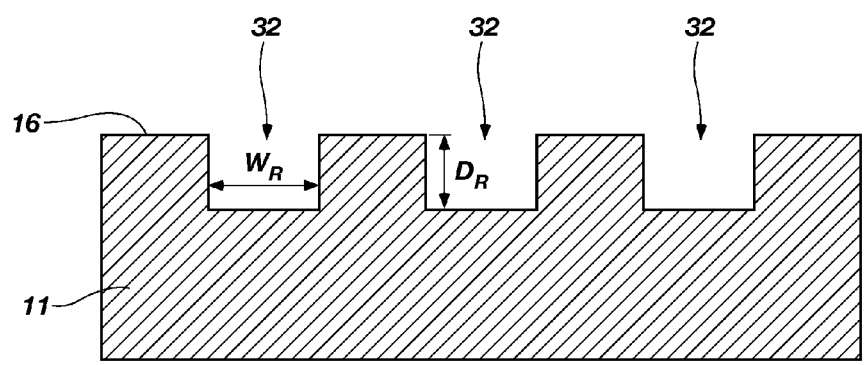
FIG. 7 is a cross-sectional view like that of FIGS. 3 and 5, but illustrates a portion of the tool shown in FIG. 6 taken along section line 107-107 shown therein.

FIG. 7 is a cross-sectional view of a portion of the drill bit 10 of FIG. 6 taken along section line 107-107 shown in FIG. 6. As shown in FIG. 7, in some embodiments, the recesses 32 may have an average depth $D_R$ of about 0.254 mm (about 0.010 in) or more, about 0.381 mm (0.015 in or more, or even about 0.762 mm (about 0.030 in) or more. In some embodiments, the recesses 32 may have an average width $W_R$ of about 0.762 mm (about 0.030 in) or more, or even about 1.5 mm (about 0.060 in) or more. In embodiments in which the recesses 32 are elongated, they may have an average length of about 6.35 mm (about 0.25 in) or more, about 19.05 mm (about 0.75 in) or more, or even about 38.4 mm (1.5 in) or more. Though the recesses 32 are shown in FIG. 7 oriented transverse to the general direction of fluid flow through the fluid course 13 during a drilling operation, recesses 32 may be oriented in a direction generally parallel to the direction of fluid flow. Recesses 32 may have an average length of about 50.8 mm (about 2.0 in) or more, or even about 152.4 mm (about 6.0 in) or more.

The recesses 32 may be formed on the bit body 11 of the drill bit 10 using any of a number of techniques. For example, the recesses 32 may be machined into the exterior surface 16 of the bit body 11 using a machining process, such as a milling process or a drilling process. Such processes may be desirable when the bit body 11 is formed of and comprises a material, such as steel, that may be machined relatively easily. In additional embodiments, bit body 11 may comprise a material that is not easily machined. For example, the bit body 11 may comprise a particle-matrix composite material, such as cobalt-cemented tungsten carbide, which may be relatively difficult to machine. Such bit bodies 11 are often formed using an infiltration process, in which the bit body 11 is formed using a casting process in a mold. In particular, a mold is formed in a refractory material, such as graphite, for example, and the mold is formed to include a mold cavity having a shape corresponding to the shape of the bit body 11 to be formed therein. In such processes, the recesses 32 may be formed into the exterior surface 16 of the bit body 11 by providing a surface within the mold cavity that includes protrusions having a shape corresponding to the recesses 32 to be formed in the bit body 11. As the bit body 11 is then cast within the mold cavity and adjacent the surface that includes the protrusions, the protrusions will form complementary recesses 32 on the exterior surface 16 of the bit body 11 when the bit body 11 is removed from the mold.

Figure 8:
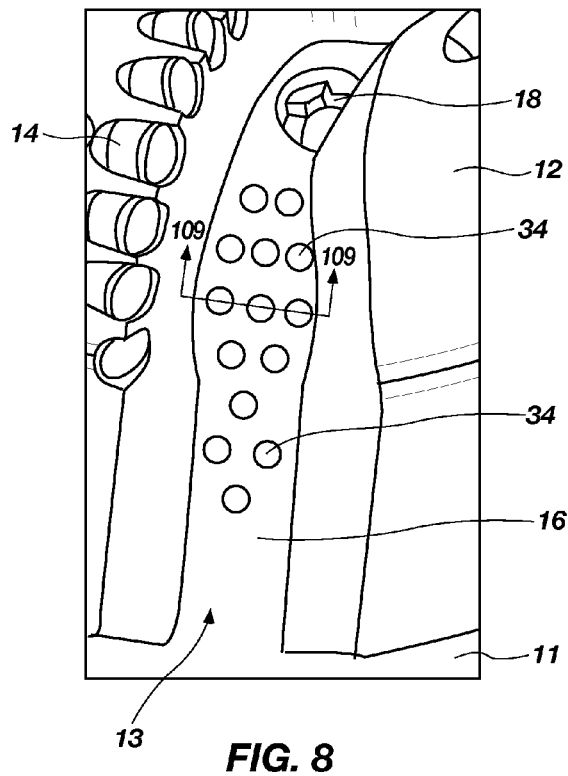
FIG. 8 is similar to FIGS. 2, 4, and 6, and illustrates yet another texture or pattern that may be formed on an exterior surface of a tool in accordance with additional embodiments of the present invention for improving adherence of anti-balling material to such tools.

Referring to FIG. 8, in some embodiments of the invention, a plurality of recesses 34 may be formed or otherwise provided in the exterior surface 16 of the bit body 11 of the drill bit 10. As shown in FIG. 8, the recesses 34 may be generally shaped as a portion of a sphere, for example, as a hemisphere. The recesses 34 may comprise a plurality of discrete, laterally isolated recesses 34, as shown in FIG. 8. Such discrete recesses 34 may be disposed in an ordered array over a region of the exterior surface 16 of the bit body 11, or they may be randomly located over the exterior surface 16 of the bit body 11. Thus, the recesses 34 may define or provide a texture or pattern on the exterior surface 16 of the bit body 11, which may improve the usable life of the anti-balling material 22 when the anti-balling material 22 is disposed over the texture or pattern.

Figure 9:
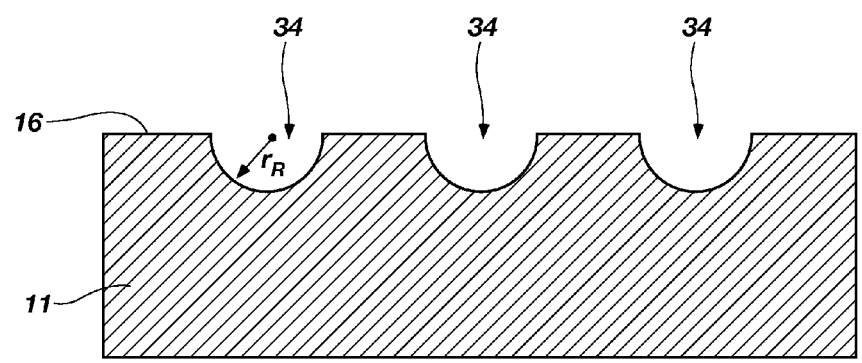
FIG. 9 is a cross-sectional view like that of FIGS. 3, 5, and 7, but illustrates a portion of the tool shown in FIG. 8 taken along section line 109-109 shown therein.

FIG. 9 is a cross-sectional view of a portion of the drill bit 10 of FIG. 8 taken along section line 109-109 shown in FIG. 8. As shown in FIG. 9, in some embodiments, the recesses 34 may have an average radius $r_R$ of about 0.254 mm (about 0.010 in) or more, about 2.54 mm (about 0.10 in) or more, or even about 25.4 mm (about 1.0 in) or more. In other embodiments, recesses 34 may have an average radius $r_R$ of less than about 0.254 mm (about 0.010 in).

Figure 10A:
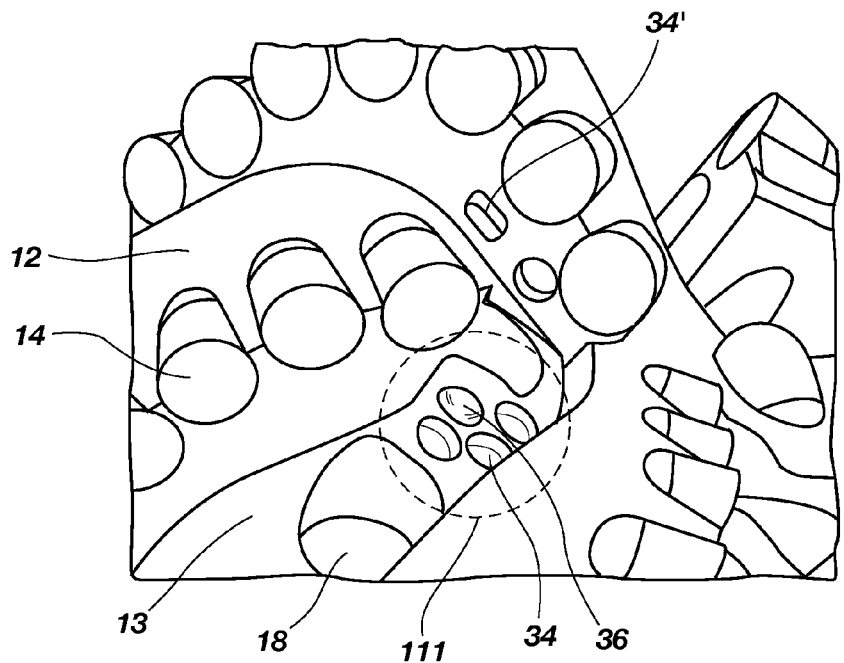
FIG. 10A is a perspective view of a portion of the tool shown in FIGS. 8 and 9.
Figure 10B:
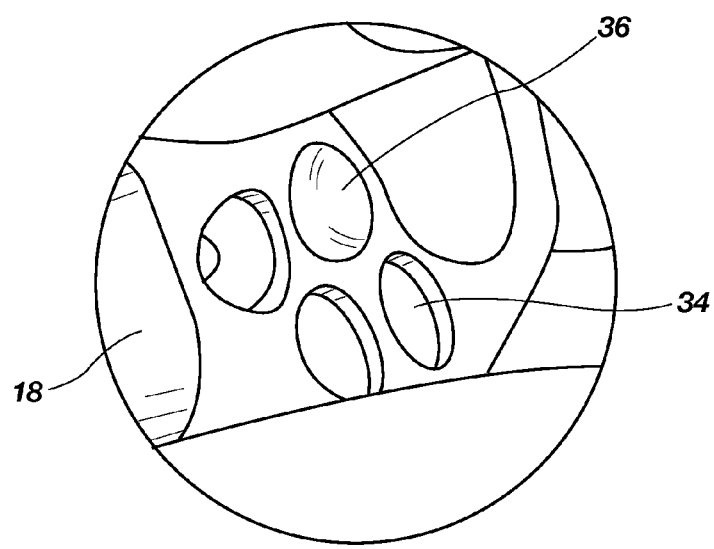
FIG. 10B is a perspective view showing enlarged detail of a portion of the tool shown in FIGS. 8 through 10B, shown within the area of circle 111.

FIG. 10A is a perspective view showing a portion of the drill bit 10 shown in FIG. 8. The recesses 34 are shown within a fluid course 13 between blades 12 of the drill bit 10. In some embodiments, recesses 34' may be placed adjacent to blades 12. The recesses 34 are shown enlarged and in greater detail in FIG. 10B, which includes the portion of the drill bit 10 shown in FIG. 10A within the area of circle 111. In some embodiments, one or more inserts 36 may be disposed at least partially within recesses 34. As shown in FIG. 10B, inserts 36 may be substantially spherical. Inserts 36 may be formed to be spheres, without sharp edges, thus limiting or avoiding problems associated with breakage of the inserts 36 at their edges or corners. Recesses 34 may be shaped as a portion of a sphere (e.g., as a hemisphere), having only one sharp edge, to limit or avoid breakage of the material of the bit body 11. Recesses 34 and inserts 36 may also be shaped in any other shape, such as rectangular, triangular, etc. Inserts 36 may be selected to have an anti-balling material on a surface thereof, or may be formed of an anti-balling material. In certain embodiments, inserts 36 may be formed of a metal, a metal matrix, a polymer, or any other material, and may be coated with an anti-balling material. For example, coatings of the anti-balling material may be applied using a thermal spray process (e.g., a wire arc spray process, chemical vapor deposition, processes for applying DLC coatings, etc.). In some embodiments, inserts 36 may overlap recess 34 edges to better protect the edges from wear. In other words, the exposed portion of an insert 36 may have a larger dimension (diameter, width, etc.) than the portion of the insert 36 disposed within a recess 34. In some embodiments, insert 36 may be formed such that the exposed surface of the insert 36 is flush with the surface of the surrounding fluid course 13. In other embodiments, the exposed surface of the insert 36 may be raised or lowered with respect to the surface of the fluid course 13. A protruding insert 36 having an anti-balling material on a surface thereof may be placed in an area of the bit body 11 prone to balling, such that large areas of balling are less likely to form. A protruding insert 36 may have a larger exposed surface area than an insert 36 that fits within the same recess 34 and is flush with the surrounding fluid course 13. Protruding inserts 36 may increase the quantity of anti-balling material in areas prone to balling.

In some embodiments, inserts 36 may be mechanically pressed into recesses 34. Inserts 36 and/or surfaces defining recesses 34 may be serrated or otherwise treated to increase mechanical strength of the attachment between surfaces defining recesses 34 and inserts 36. The inserts 36 and/or surfaces defining recesses 34 may be mechanically and/or chemically treated to effect bonding. For example, if an insert 36 is formed of a fluorocarbon polymer (e.g., TEFLON®), the portion of the insert 36 configured to be fitted into a recess 34 may be etched to improve adhesion to the bit body 11. Etching may include exposing the insert 36 or a portion thereof to an acid. The acid may strip fluorine molecules from the surface, making the surface less slippery (i.e., more prone to forming a bond with an adhesive). As an additional example, the inserts 36 and/or surfaces defining recesses 34 may have ridges or other physical contours that may improve mechanical attachment. In some embodiments, an adhesive or glue may coat the interface between an insert 36 and a surface defining recess 34. Adhesion techniques may be combined as appropriate (e.g., an insert 36 may be serrated and etched, and an adhesive may be applied). In some embodiments, inserts 36 may be installed into recesses 34 with a brazing process and/or a welding process.

Figure 11:
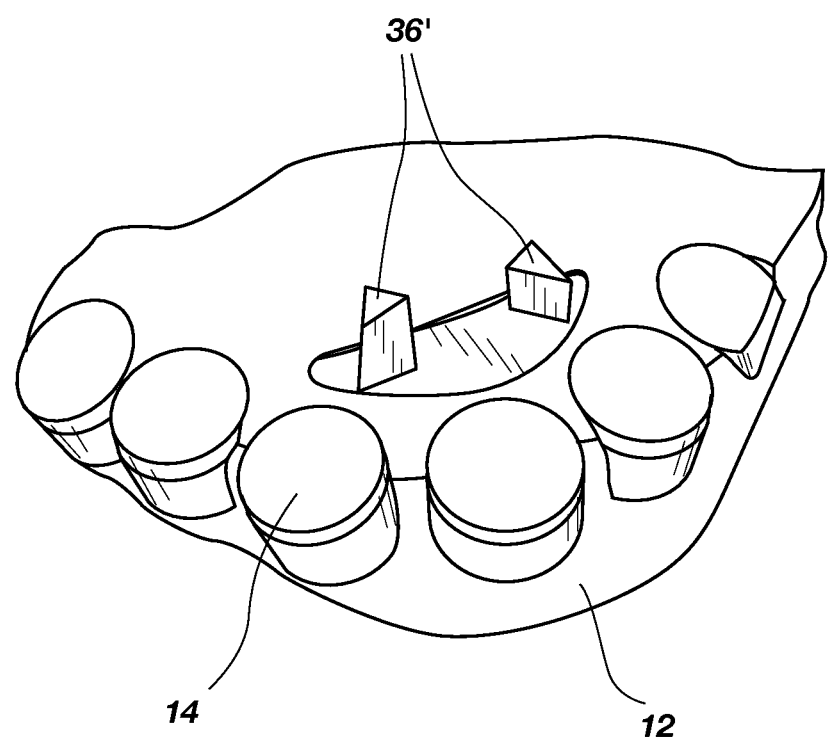
FIG. 11 is a perspective view of a portion of a tool in accordance with an embodiment of the present invention.

FIG. 11 is a perspective view showing a portion of a blade 12 of a drill bit 10 in accordance with some embodiments of the invention. The blade 12 may include one or more inserts 36'. Inserts 36' may be "chip splitters," configured to break up cuttings as the cuttings are formed, such as with one or more sharp edges. Inserts 36' may comprise an anti-balling material to reduce drag on cutting fluid and cuttings. Inserts 36' may be formed and installed into recesses (e.g., recesses 34, 34') with similar materials and methods as inserts 36 shown in FIGS. 10A and 10B (e.g., may be formed of one material, and coated with a different, anti-balling material). In some embodiments, multiple chip splitters may comprise an insert 36'.

Inserts 36 and 36' may be removed from recesses 34 and 34', such as after the drill bit 10 has been in service. Inserts 36 and 36' may be removed because they are worn, damaged, or inappropriate for a selected application. Inserts 36 and 36' may be removed by mechanical and/or chemical means (e.g., adhesive removers, hot baths, abrasive blasting with sand and/or metal shot, etc.). For example, inserts 36 and 36' may be prised out of recesses 34 and 34'. After inserts 36 and 36' have been removed, replacement inserts 36 and 36' may be placed in the recesses 34 and 34'. Replacement inserts 36 and 36' may have an anti-balling material as described above, and may be installed in the bit body 11 as described above. In some embodiments, replacement inserts 36 and 36' may be substantially similar to the inserts 36 and 36' they replace. In some embodiments, replacement inserts 36 and 36' may have different properties than the inserts 36 and 36' they replace, such as when a drill bit 10 is to be used for a different application from its previous use.

Figure 12:
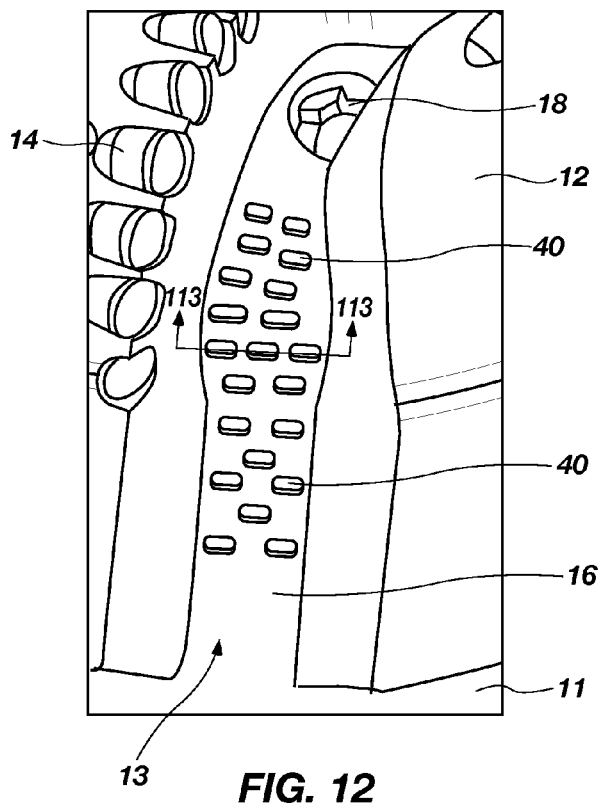
FIG. 12 is similar to FIGS. 2, 4, 6, and 8, and illustrates yet another texture or pattern that may be formed on an exterior surface of a tool in accordance with additional embodiments of the present invention for improving adherence of anti-balling material to such tools.

Referring to FIG. 12, in some embodiments of the invention, a plurality of protrusions 40 may be formed or otherwise provided on the exterior surface 16 of the bit body 11 of the drill bit 10. As shown in FIG. 12, in some embodiments, the protrusions 40 may be generally elongated in shape, as previously described in relation to the recesses 32 of FIG. 6. The protrusions 40 may comprise discrete, laterally isolated protrusions 40 that are separated from one another. Such discrete protrusions 40 may be randomly located over the exterior surface 16 of the bit body 11, as shown in FIG. 12, or they may be disposed in an ordered array over a region of the exterior surface 16 of the bit body 11. Furthermore, in additional embodiments, the protrusions 40 may have any other shape such as, for example, circular, oval, rectangular, square, triangular, etc. In embodiments having elongated protrusions 40, the protrusions 40 may be oriented within the fluid course 13 to extend in a direction that is generally parallel to the general direction of fluid flow through the fluid course 13 during a drilling operation; they may be oriented transverse to the direction of fluid flow through the fluid course 13; or some protrusions 40 may be oriented parallel to the direction of fluid flow through the fluid course 13 and some may be oriented transverse to the direction of fluid flow through the fluid course 13. For example, in some embodiments, a plurality of crisscrossing elongated protrusions may be provided in a region of the exterior surface 16 within a fluid course 13. Thus, the protrusions 40 may be used to define or provide a texture or pattern on the exterior surface 16 of the bit body 11, in a manner similar to the previously described recesses 32 of FIGS. 6 and 7, which may improve the usable life of the anti-balling material 22 when the anti-balling material 22 is disposed over the texture or pattern.

Figure 13:
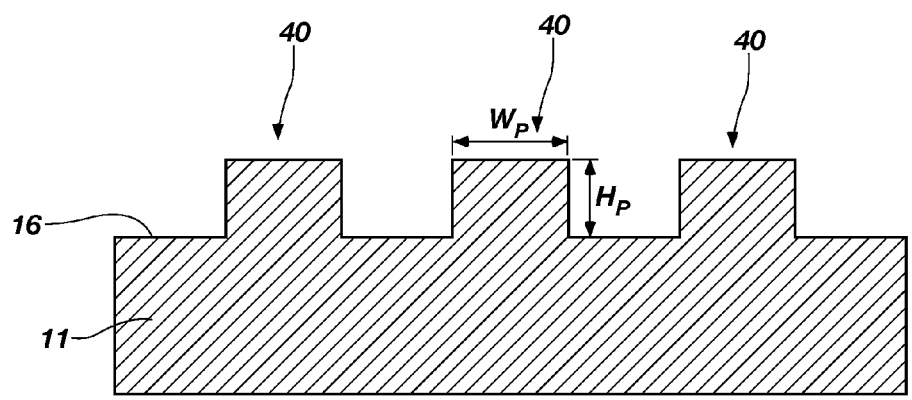
FIG. 13 is a cross-sectional view like that of FIGS. 3, 5, 7, and 9, but illustrates a portion of the tool shown in FIG. 12 taken along section line 113-113 shown therein.

FIG. 13 is a cross-sectional view of a portion of the drill bit 10 of FIG. 12 taken along section line 113-113. As shown in FIG. 13, in some embodiments, the protrusions 40 may have an average height $H_p$ of about 0.254 mm (about 0.010 in) or more, about 0.381 mm (0.015 in) or more, or even about 0.762 mm (about 0.030 in) or more. In some embodiments, the protrusions 40 may have an average width $W_P$ of about 0.787 mm (about 0.031 in) or more, or even about 1.5 mm (about 0.060 in) or more. In embodiments in which the protrusions 40 may be elongated, and may have an average length of about 6.35 mm (about 0.25 in) or more, about 19.05 mm (about 0.75 in) or more, or even about 38.4 mm (1.5 in) or more.

The protrusions 40 may be formed on the bit body 11 of the drill bit 10 using any of a number of techniques. For example, the protrusions 40 may be formed on the exterior surface 16 of the bit body 11 using a machining process to machine away surrounding material of the bit body 11, such as a milling process or a drilling process. Such processes may be desirable when the bit body 11 is formed of and comprises a material, such as steel, that may be machined relatively easily. In additional embodiments in which the bit body 11 is formed using an infiltration process, the protrusions 40 may be formed on the exterior surface 16 of the bit body 11 by providing a surface within the mold cavity that includes recesses having a shape corresponding to the protrusions 40 to be formed in the bit body 11. As the bit body 11 is cast within the mold cavity and adjacent the surface that includes the recesses, the recesses form complementary protrusions 40 in the exterior surface 16 of the bit body 11, which become visible when the bit body 11 is removed from the mold.

In some embodiments, recesses 32, 34, 34', inserts 36, 36', and/or protrusions 40 may be configured to direct drilling mud, such as to enhance cleaning of the junk slots, limit blade erosion, break up cuttings, etc. Inserts 36, 36' and/or protrusions 40 may be configured to have low friction to reduce drag on drilling mud (including formation cuttings). Drag is known to reduce drilling efficiency and increase the chance of balling. Reducing drag may therefore increase drilling efficiency and decrease the chance of balling. Inserts 36, 36' and/or protrusions 40 may be configured as chip splitters (i.e., may be configured to break up cuttings before the cuttings ball). In such embodiments, the chip splitters may comprise an anti-balling material 22 having a low coefficient of friction (e.g., about 0.5 or less, about 0.2 or less, or about 0.04 or less), such that drag on the drilling chips is limited. Chip splitters may comprise a support material (e.g., a metal, a metal alloy, a particle-matrix composite material, or a polymer) to reinforce the anti-balling material 22 of the chip splitter. The anti-balling material 22 may have a lower coefficient of friction than the support material. Chip splitters may be positioned adjacent to blades, such as in recesses 34' shown in FIG. 10.

FIGS. 14 through 17 illustrate various displacement members that may be used within a mold in an infiltration process for forming a bit body 11 that include a texture or pattern configured to define a complementary texture or pattern on an exterior surface 16 of a bit body 11 of a drill bit 10 in accordance with embodiments of the present invention.

Figure 14:
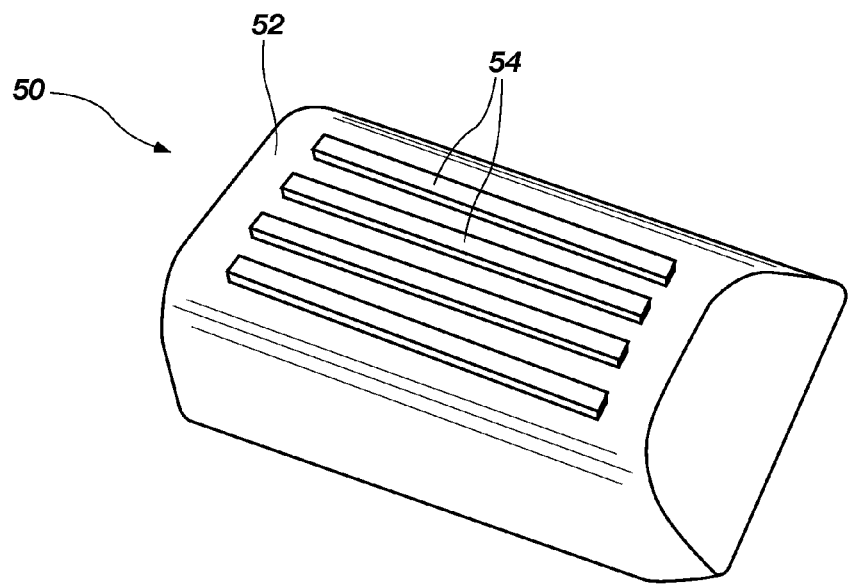
FIGS. 14 through 17 are perspective views of various displacement members that include a template texture or pattern for forming a complementary texture or pattern on and/or in an exterior surface of a downhole tool, like that shown in FIG. 1, during an infiltration or casting process used to form the downhole tool within a mold.

Referring to FIG. 14, a displacement member 50 is illustrated that is configured to define at least a portion of a fluid course 13 of a bit body 11 of a drill bit 10. A body 52 of the displacement member 50 may comprise compacted resin-coated sand, and elongated strips 54 may be attached to a surface of the body 52 of the displacement member 50. The strips 54 may comprise, for example, elongated strips of graphite-based material, such as that sold by GrafTech International LTD. of Parma, Ohio, under the name GRAFOIL®. The strips 54 may be used to form template protrusions on the body 52 of the displacement member 50. Thus, when the displacement member 50 is positioned within a mold and a bit body 11 is cast within the mold and over and around the displacement member 50 and the strips 54 using an infiltration process, the graphite strips 54 may define complementary elongated recesses in the exterior surface 16 of the bit body 11 within the fluid course 13 defined by the body 52 of the displacement member 50, similar to the recesses 32 shown in FIGS. 6 and 7. The strips 54 of the displacement member 50 shown in FIG. 14, however, are oriented on the displacement member body 52 in such an orientation as to cause the resulting recesses formed in the exterior surface 16 of the bit body 11 to extend generally parallel to the general direction of fluid flow through the fluid course 13 formed by the displacement member 50 during drilling.

Figure 15:
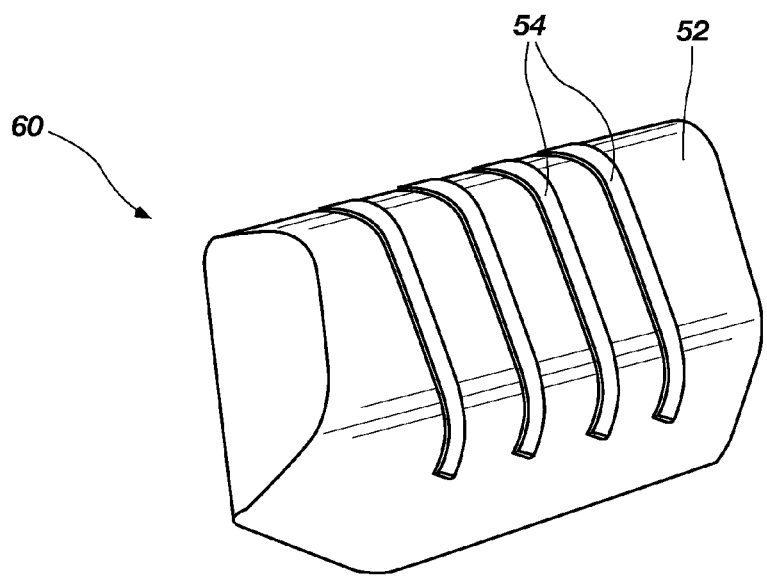

FIG. 15 illustrates a displacement member 60 similar to the displacement member 50 of FIG. 14, and includes a body 52 and elongated strips 54 as previously described. On the displacement member 60, however, the elongated strips 54 are oriented on the body 52 in such an orientation as to cause the resulting recesses formed in the exterior surface 16 of the bit body 11 to extend generally transverse to the general direction of fluid flow through the fluid course 13 formed by the displacement member 60 during drilling.

Figure 16:
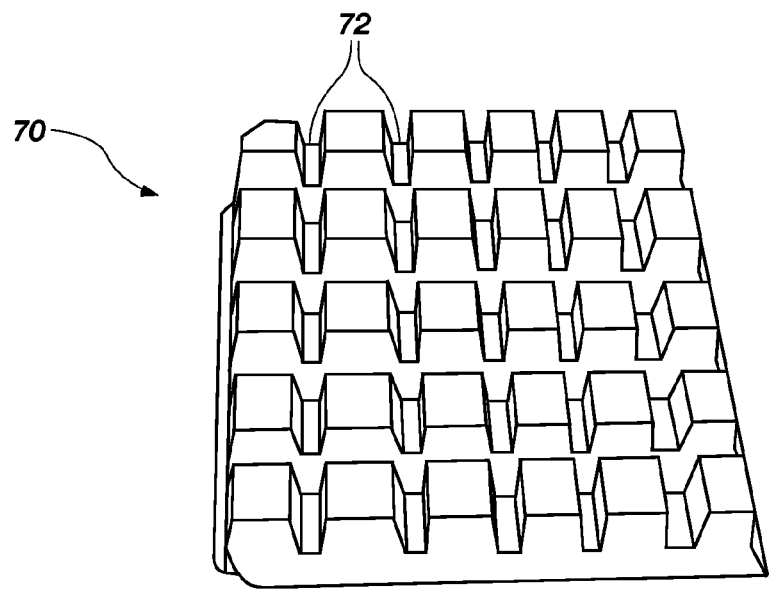

FIG. 16 illustrates another displacement member 70 configured to define a texture or pattern on an exterior surface 16 of a bit body 11 of a drill bit 10. The displacement member 70 may comprise a clay material that has been shaped to include crisscrossing template recesses 72 therein. Thus, when the displacement member 70 is positioned within a mold and a bit body 11 is cast within the mold and over and around the displacement member 70 in an infiltration process, the template recesses 72 may define complementary crisscrossing protrusions on the exterior surface 16 of the bit body 11.

Figure 17:
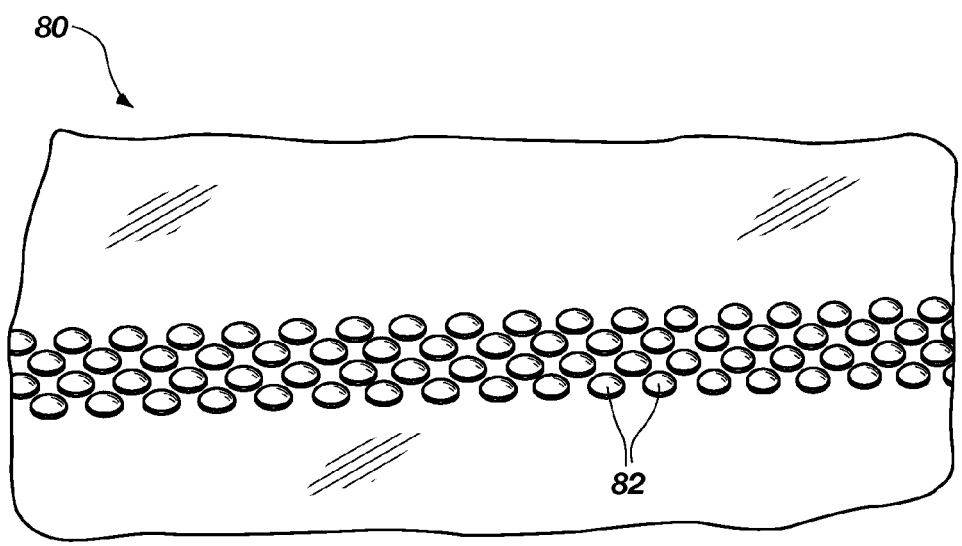

FIG. 17 illustrates another displacement member 80 configured to define a texture or pattern on an exterior surface 16 of a bit body 11 of a drill bit 10. The displacement member 80 may comprise a graphite foil material (such as that sold by GrafTech International LTD. of Parma, Ohio, under the name GRAFOIL®) that has been shaped to include an array of generally circular, discrete, and laterally isolated template protrusions 82 thereon. Thus, when the displacement member 80 is positioned within a mold and a bit body 11 is cast within the mold and over and around the displacement member 70 in an infiltration process, the template protrusions 82 may define a complementary array of recesses on the exterior surface 16 of the bit body 11.

Figure 18:
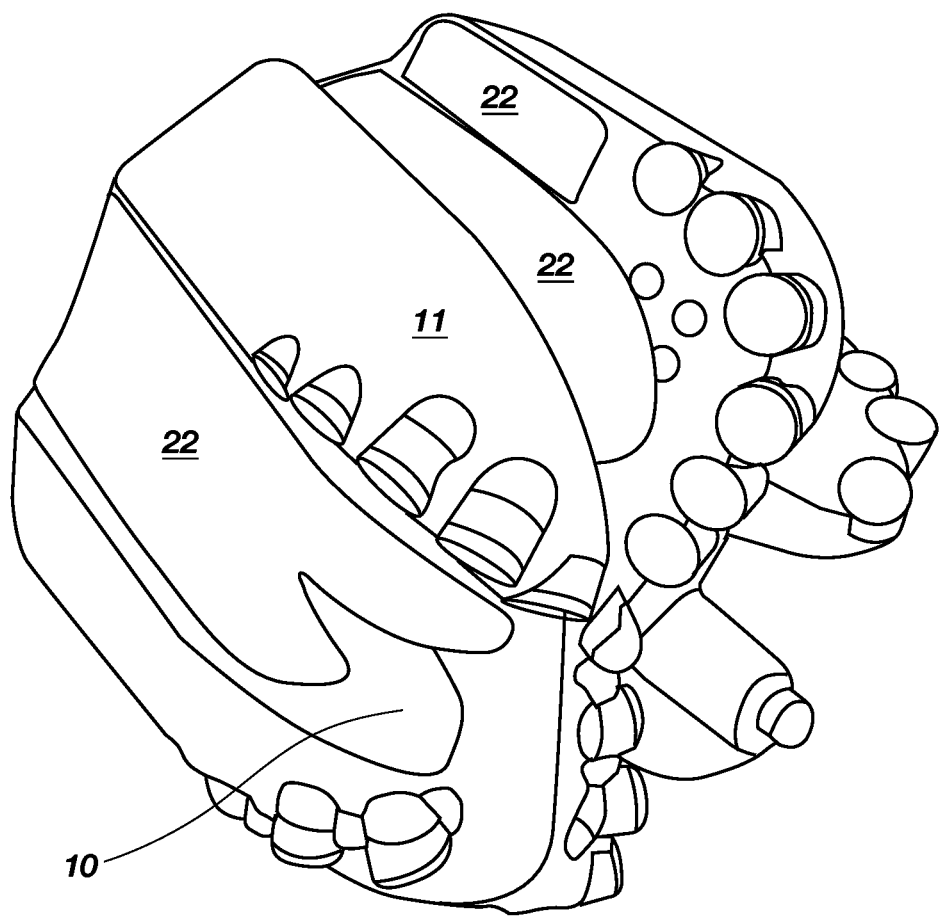
FIG. 18 is a perspective view illustrating anti-balling material applied to an exterior surface of a downhole tool like that of FIG. 1 over a texture or pattern provided on the surface in accordance with embodiments of the present invention.

As shown in FIG. 18, after providing a pattern or texture in and/or on one or more regions of the exterior surface 16 of a bit body 11 of a drill bit 10, an anti-balling material 22 may be provided over the pattern or texture, as previously described herein. For instance, the anti-balling material 22 may be a sheet, and may be formed over contours of regions of the exterior surface 16 of the bit body 11 of a drill bit 10. In some embodiments, the sheet of anti-balling material 22 may have recesses therein or protrusions therefrom, such as those described above in reference to FIGS. 6 through 13. Recesses or protrusions of the anti-balling material 22 may be configured to direct the flow of drilling mud (including formation cuttings).

In additional embodiments of the present invention, a drill bit 10 like that previously described herein (or any other downhole tool) may include pre-formed inserts that comprise an anti-balling material 22. Such inserts may be separately formed from the bit body 11 and subsequently attached thereto within complementary recesses formed in the exterior surface 16 of the bit body 11 of the drill bit 10. Furthermore, such inserts may be replaceable.

Figure 19:
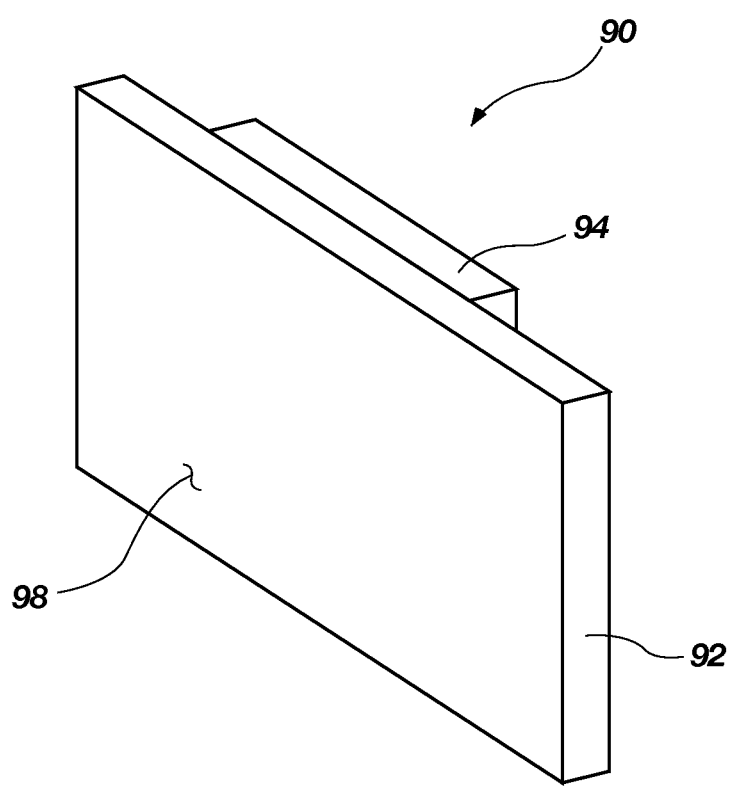
FIG. 19 illustrates an insert that includes an anti-balling material, one or more of which may be secured to a body of a downhole tool in accordance with additional embodiments of the invention.

For example, FIG. 19 illustrates an embodiment of an insert 90 of the present invention. The insert 90 includes an anti-balling body 92 comprising an anti-balling material 22 as previously described herein. The anti-balling body 92 may be formed, using, for example, a molding process (e.g., an injection molding process).

As shown in FIG. 19, the anti-balling body 92 of the insert 90 includes an outer surface 98 comprising the anti-balling material 22. The outer surface 98 may be configured to define an exposed, outer surface of the drill bit 10. For example, the outer surface 98 may be configured to define an exposed, outer surface of the drill bit 10 within a fluid course 13 thereof. The insert 90, and the complementary recess in the bit body 11 in which the insert 90 is to be received, may be sized, shaped, and otherwise configured such that the outer surface 98 of the insert 90 is substantially continuous, flush, and co-extensive with the surrounding exterior surface 16 of the bit body 11. Thus, although the outer surface 98 of the anti-balling body 92 is shown to be generally rectangular and planar, the outer surface 98 may have any shape and any contour that is desirable for the outer surface of the drill bit 10. In some embodiments, the outer surface 98 may include channels, ribs, protrusions, or recesses to redirect drilling mud and cuttings.

The anti-balling body 92 and, hence, a layer of anti-balling material 22 defined by the anti-balling body 92, may have an average thickness of about 0.20 mm (about 0.008 in), or even greater than about 3.175 mm (about 0.125 in).

The insert 90 optionally may comprise a base member 94. The base member 94 may be configured for attaching the anti-balling body 92 to the bit body 11 of a drill bit 10, and may comprise a different material than the anti-balling body 92. For example, the base member 94 may comprise a metal or metal alloy (e.g., steel), a particle-matrix composite material, such as a cemented carbide material (e.g., cemented tungsten carbide), or a polymer. In some embodiments, the base member 94 may comprise a material that is at least substantially identical to the material used to form the bit body 11 of a drill bit 10 to which the insert 90 is to be attached.

In some embodiments, the base member 94 may comprise a topographical pattern and/or a porous mass, as previously described herein, and the anti-balling body 92 may be provided over (e.g., formed on) the topographical pattern and/or a porous mass.

In some embodiments, the base member 94 may be integrally formed with the anti-balling body 92. For example, the base member 94 may be inserted within a mold cavity used to form the anti-balling body 92, and the anti-balling body 92 may be formed (i.e., molded) around the base member 94. In additional embodiments, the base member 94 may be attached to the anti-balling body 92 using fasteners (e.g., screws or bolts) and/or an adhesive. In such configurations, the insert 90 may be removable from the bit body 11 of the drill bit 10, and, hence, may be replaceable should the anti-balling body 92 wear to an unacceptable level during a drilling operation, thus facilitating repair and continued use of the drill bit 10.

By way of example and not limitation, the base member 94 may be configured to be bolted to the bit body 11 to attach the insert 90 to the bit body 11, or the base member 94 may be configured to mechanically lock with the bit body 11 such as, for example, with a tongue-and-groove type joint therebetween (i.e., one of the bit body 11 and the base member 94 including a tongue and the other including a complementary groove for receiving the tongue therein). In yet additional embodiments, the anti-balling body 92 and/or the base member 94 may be attached to the bit body 11 using a press-fit therebetween, a shrink-fit therebetween and/or using a brazing process and/or a welding process.

In yet additional embodiments of the invention, an anti-balling body 92, like that described in relation to FIG. 19, may be formed directly within a complementary recess formed in an exterior surface 16 of a bit body 11 of a drill bit 10 using, for example, a casting process.

Although embodiments of the invention have been described hereinabove with respect to a fixed-cutter earth-boring rotary drill bit, embodiments of the invention also include other types of downhole tools. As used herein, the term "downhole tool" means and includes any tool that is used to form and/or service a wellbore. "Servicing" a wellbore means and includes any operation in which a tool contacts a portion of the wellbore. Downhole tools include, for example, earth-boring tools such as drill bits (e.g., rotary drill bits such as fixed-cutter drill bits, roller cone drill bits, diamond impregnated drill bits, coring bits, and percussion bits), casing and liner drilling tools, reamers, and other hole-opening tools, as well as stabilizers, packers, and steerable assemblies such as steerable liner systems.

Additional non-limiting example embodiments of the invention are described below.

Embodiment 1

A downhole tool, comprising: a body having a surface comprising a topographical pattern defined by at least one of a recess extending into the surface and a protrusion protruding from the surface; and an anti-balling material disposed over at least a portion of the surface comprising the pattern therein, the anti-balling material having a composition selected to reduce accumulation of formation cuttings thereon when the downhole tool is used to form or service a wellbore.

Embodiment 2

The downhole tool of embodiment 1, wherein the anti-balling material comprises a hydrophobic polymer, a metal, a metal alloy, a ceramic, diamond, diamond-like carbon, graphite, molybdenum disulfide, boron nitride, or silicone.

Embodiment 3

The downhole tool of embodiment 2, wherein the anti-balling material comprises a mixture of a metal or metal alloy and a hydrophobic polymer material.

Embodiment 4

The downhole tool of embodiment 1, wherein the anti-balling material comprises a material having a coefficient of friction of about 0.5 or lower.

Embodiment 5

The downhole tool of embodiment 1, wherein the anti-balling material comprises a material having a coefficient of friction of about 0.2 or lower.

Embodiment 6

The downhole tool of embodiment 1, wherein the anti-balling material comprises a layer of the anti-balling material disposed on the at least a portion of the surface comprising the pattern.

Embodiment 7

The downhole tool of embodiment 6, wherein the layer of the anti-balling material has an average thickness of at least about 0.127 mm (about 0.005 in).

Embodiment 8

The downhole tool of embodiment 7, wherein the layer of the anti-balling material has an average thickness of at least about 0.254 mm (about 0.010 in).

Embodiment 9

The downhole tool of embodiment 1, wherein the topographical pattern comprises a plurality of discrete, laterally isolated protrusions.

Embodiment 10

The downhole tool of embodiment 9, wherein the discrete, laterally isolated protrusions of the plurality of discrete, laterally isolated protrusions are disposed in an ordered array.

Embodiment 11

The downhole tool of embodiment 1, wherein the topographical pattern comprises a plurality of discrete, laterally isolated recesses.

Embodiment 12

The downhole tool of embodiment 11, wherein the discrete, laterally isolated recesses of the plurality of discrete, laterally isolated recesses are disposed in an ordered array.

Embodiment 13

The downhole tool of embodiment 11, further comprising an insert, wherein the insert is disposed at least partially within a recess.

Embodiment 14

A downhole tool, comprising: a body having a surface comprising at least one recess extending into the surface of the body; and an insert disposed within the at least one recess, the insert comprising an anti-balling material having a composition selected to reduce accumulation of formation cuttings thereon when the downhole tool is used to form or service a wellbore.

Embodiment 15

The downhole tool of embodiment 14, wherein the surface of the body comprises a plurality of recesses extending into the surface of the body, and wherein the downhole tool further comprises an insert disposed in each recess of the plurality of recesses, each insert comprising the anti-balling material having the composition selected to reduce accumulation of formation cuttings thereon when the downhole tool is used to form or service a wellbore.

Embodiment 16

The downhole tool of embodiment 14, wherein the plurality of recesses comprises a plurality of discrete, laterally isolated recesses.

Embodiment 17

A downhole tool, comprising: a body having a surface; at least one porous mass over the surface of the body; and an anti-balling material disposed over the at least one porous mass, the anti-balling material having a composition selected to reduce accumulation of formation cuttings thereon when the downhole tool is used to form or service a wellbore.

Embodiment 18

The downhole tool of embodiment 17, wherein the at least one porous mass comprises a spray-deposited material.

Embodiment 19

The downhole tool of embodiment 18, wherein the body comprises tungsten carbide and the at least one porous mass comprises nickel aluminide.

Embodiment 20

The downhole tool of embodiment 17, wherein the anti-balling material comprises a fluoropolymer.

Embodiment 21

The downhole tool of embodiment 20, wherein the anti-balling material comprises a mixture of a metal or metal alloy and a fluoropolymer.

Embodiment 22

The downhole tool of embodiment 17, wherein the anti-balling material comprises a ceramic.

Embodiment 23

The downhole tool of embodiment 17, wherein the anti-balling material comprises diamond, diamond-like carbon, graphite, molybdenum disulfide, boron nitride, or silicone.

Embodiment 24

The downhole tool of embodiment 17, wherein at least a portion of the anti-balling material is infiltrated into pores of the at least one porous mass.

Embodiment 25

The downhole tool of embodiment 17, wherein the anti-balling material comprises a layer of the anti-balling material disposed on the at least one porous mass.

Embodiment 26

The downhole tool of embodiment 25, wherein the layer of the anti-balling material has an average thickness of at least about 0.0254 mm (about 0.001 in).

Embodiment 27

The downhole tool of embodiment 25, wherein the layer of the anti-balling material has an average thickness of at least about 0.20 mm (about 0.008 in).

Embodiment 28

The downhole tool of embodiment 17, wherein the at least one porous mass comprises a plurality of porous masses defining a topographical pattern on the surface of the body.

Embodiment 29

The downhole tool of embodiment 28, wherein the plurality of porous masses comprises a plurality of discrete, laterally isolated porous deposits.

Embodiment 30

The downhole tool of embodiment 29, wherein porous deposits of the plurality of discrete, laterally isolated porous deposits are disposed in an ordered array.

Embodiment 31

The downhole tool of embodiment 17, wherein the at least one porous mass comprises a layer of porous material.

Embodiment 32

A method of forming a downhole tool, comprising: forming at least one of a recess extending into a body of the downhole tool and a protrusion protruding from a body of the downhole tool; providing an anti-balling material over at least a portion of the surface; and selecting the anti-balling material to have a composition for reducing accumulation of formation cuttings thereon when the downhole tool is used to form or service a wellbore. The downhole tool of embodiment 32 comprises a surface that extends into or over the recess or protrusion.

Embodiment 33

The method of embodiment 32, wherein forming at least one of a recess extending into a body of the downhole tool and a protrusion protruding from a body of the downhole tool comprises: providing at least one of a plurality of template recesses and a plurality of template protrusions on a surface within a mold cavity having a shape configured to define at least a portion of the body of the downhole tool; and casting the at least a portion of the body of the downhole tool within the mold cavity.

Embodiment 34

The method of embodiment 33, wherein providing the at least one of a plurality of template recesses and a plurality of template protrusions on the surface within the mold cavity comprises: forming the at least one of a plurality of template recesses and a plurality of template protrusions on a displacement member; and placing the displacement member within the mold cavity prior to casting the at least a portion of the body of the downhole tool within the mold cavity.

Embodiment 35

The method of embodiment 34, further comprising selecting the displacement member to comprise at least one of a body comprising clay, a body comprising compacted resin-coated sand, and a body comprising graphite.

Embodiment 36

The method of embodiment 32, wherein forming at least one of a recess extending into a body of the downhole tool and a protrusion protruding from a body of the downhole tool comprises machining the surface of a body of the downhole tool.

Embodiment 37

The method of embodiment 32, wherein providing the anti-balling material over the at least a portion of the surface comprises thermally spraying the anti-balling material over the at least a portion of the surface.

Embodiment 38

The method of embodiment 32, wherein providing the anti-balling material over the at least a portion of the surface comprises forming a layer of the anti-balling material and adhering the layer of the anti-balling material to the at least a portion of the surface.

Embodiment 39

A method of forming a downhole tool, comprising: providing a porous mass over a surface of a body of the downhole tool; providing an anti-balling material over at least a portion of the porous mass; and selecting the anti-balling material to have a composition for reducing accumulation of formation cuttings thereon when the downhole tool is used to form or service a wellbore.

Embodiment 40

A method of forming a downhole tool, comprising: forming a recess in a surface of a body of the downhole tool; forming an insert comprising an anti-balling material; selecting the anti-balling material to have a composition for reducing accumulation of formation cuttings thereon when the downhole tool is used to form or service a wellbore; disposing the insert within the recess; and attaching the insert to the body of the downhole tool.

Embodiment 41

The method of embodiment 40, wherein forming an insert comprising an anti-balling material comprises: forming an insert comprising a metal, metal matrix, or polymer; and coating the insert with an anti-balling material.

Embodiment 42

The method of embodiment 40, wherein forming an insert comprising an anti-balling material comprises faulting an insert comprising a material with a coefficient of friction of about 0.5 or lower.

Embodiment 43

The method of embodiment 40, wherein forming an insert comprising an anti-balling material comprises forming an insert comprising a material with a coefficient of friction of about 0.2 or lower.

Embodiment 44

The method of embodiment 40, wherein forming an insert comprising an anti-balling material comprises forming an insert comprising a ceramic, diamond, diamond-like carbon, graphite, molybdenum disulfide, boron nitride, or silicone.

Embodiment 45

A method of forming a downhole tool, comprising: forming a recess in a surface of a body of the downhole tool; forming an insert comprising at least one of a metal, a metal matrix, or a polymer, the insert configured to fit at least partially within the recess; coating the insert with an anti-balling material; and placing the insert at least partially within the recess.

Embodiment 46

A method of repairing a downhole tool, comprising: removing an insert from a recess of the downhole tool; disposing a replacement insert within the recess, the replacement insert having an anti-balling material selected to have a composition for reducing accumulation of formation cuttings thereon when the downhole tool is used to form or service a wellbore; and attaching the replacement insert to the body of the downhole tool.

Although the foregoing description contains many specifics, these are not to be construed as limiting the scope of the present invention, but merely as providing certain exemplary embodiments. Similarly, other embodiments of the invention may be devised that do not depart from the spirit or scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method of forming a downhole tool, comprising:
   forming a topographical pattern on a bottom surface of a fluid course located between a rotationally leading surface of a first blade and a rotationally trailing surface of a second, adjacent blade of a bit body, the topographical pattern comprising at least one of a plurality of recesses extending into the bottom surface and a plurality of protrusions protruding from the bottom surface, the topographical pattern disposed between the first blade carrying a first plurality of cutting elements and the second blade carrying a second plurality of cutting elements; and
   providing an anti-balling material on at least a portion of the topographical pattern, the topographical pattern configured to improve retention of the anti-balling material on the bit body during drilling, wherein the anti-balling material has a composition selected to reduce accumulation of formation cuttings thereon when the downhole tool is used to remove formation material from a subterranean formation.

2. The method of claim 1, wherein forming a topographical pattern on a bottom surface of a fluid course comprises:
   providing at least one of a plurality of template recesses and a plurality of template protrusions on a surface within a mold cavity having a shape configured to define at least a portion of a body of the downhole tool; and
   casting the at least a portion of the body of the downhole tool within the mold cavity.

3. The method of claim 2, wherein providing the at least one of a plurality of template recesses and a plurality of template protrusions on the surface within the mold cavity comprises:
   forming the at least one of a plurality of template recesses and a plurality of template protrusions on a displacement member; and
   placing the displacement member within the mold cavity prior to casting the at least a portion of the body of the downhole tool within the mold cavity.

4. The method of claim 3, further comprising selecting the displacement member to comprise at least one of a body comprising clay, a body comprising compacted resin-coated sand, and a body comprising graphite.

5. The method of claim 1, wherein providing the anti-balling material on at least a portion of the topographical pattern comprises thermally spraying the anti-balling material over the at least a portion of the topographical pattern.

6. The method of claim 1, wherein providing the anti-balling material on at least a portion of the topographical pattern comprises forming a layer of the anti-balling material and adhering the layer of the anti-balling material to the at least a portion of the topographical pattern.

7. The method of claim 1, wherein forming a topographical pattern comprises forming a plurality of discrete, laterally isolated protrusions or recesses disposed in an ordered array.

8. The method of claim 1, wherein forming a topographical pattern comprises machining the bottom surface of the fluid course.

9. The method of claim 1, wherein providing an anti-balling material comprises providing a hydrophobic polymer, a metal, a metal alloy, a ceramic, diamond, diamond-like carbon, graphite, molybdenum disulfide, boron nitride, or silicone on at least a portion of the topographical pattern.

10. The method of claim 1, wherein providing an anti-balling material comprises providing a material having a coefficient of friction of about 0.5 or lower on at least a portion of the topographical pattern.

11. The method of claim 1, wherein providing an anti-balling material comprises providing a material having a coefficient of friction of about 0.2 or lower on at least a portion of the topographical pattern.

12. The method of claim 1, wherein providing an anti-balling material comprises forming a layer of the anti-balling material on at least a portion of the topographical pattern.

13. The method of claim 1, wherein providing an anti-balling material comprises disposing an insert at least partially within a recess, the insert comprising the anti-balling material.

14. A method of forming a downhole tool, comprising:
   providing at least one porous mass over a bottom surface of a fluid course located between a rotationally leading surface of a first blade and a rotationally trailing surface of a second, adjacent blade of a bit body of a downhole tool, the at least one porous mass comprising a topographical pattern configured to improve retention of an anti-balling material on the bit body during drilling, the topographical pattern comprising at least one of a plurality of recesses and a plurality of protrusions, the topographical pattern disposed between the first blade carrying a first plurality of cutting elements and the second blade carrying a second plurality of cutting elements; and
   providing the anti-balling material on at least a portion of the at least one porous mass, wherein the anti-balling material has a composition selected to reduce accumulation of formation cuttings thereon when the downhole tool is used to remove formation material from a subterranean formation.

15. The method of claim 14, wherein providing at least one porous mass over a bottom surface of a fluid course comprises providing the at least one porous mass comprising nickel aluminide over a bit body comprising tungsten carbide.

16. The method of claim 14, wherein providing the anti-balling material on at least a portion of the at least one porous mass comprises providing the anti-balling material comprising at least one material selected from the group consisting of fluoropolymers, metals, metal alloys, ceramics, diamond, diamond-like carbon, graphite, molybdenum disulfide, boron nitride, and silicone.

17. The method of claim 14, further comprising infiltrating at least a portion of the anti-balling material into pores of the at least one porous mass.

18. The method of claim 14, wherein providing at least one porous mass over a bottom surface of a fluid course comprises providing the at least one porous mass using a thermal spray process.

19. The method of claim 14, wherein providing at least one porous mass over a bottom surface of a fluid course comprises providing the at least one porous mass comprising tungsten carbide.

20. The method of claim 14, wherein providing at least one porous mass over a bottom surface of a fluid course comprises providing a plurality of discrete, laterally isolated porous masses over the bottom surface of the fluid course.

* * * * *

UNITED STATES PATENT AND TRADEMARK OFFICE
CERTIFICATE OF CORRECTION

| | |
|---|---|
| PATENT NO. | : 9,551,191 B2 |
| APPLICATION NO. | : 14/656080 |
| DATED | : January 24, 2017 |
| INVENTOR(S) | : Suresh G. Patel et al. |

Page 1 of 1

It is certified that error appears in the above-identified patent and that said Letters Patent is hereby corrected as shown below:

In the Specification
Column 20, Line 44, change "comprises faulting an" to --comprises forming an--

Signed and Sealed this
Tenth Day of October, 2017

Joseph Matal
*Performing the Functions and Duties of the*
*Under Secretary of Commerce for Intellectual Property and*
*Director of the United States Patent and Trademark Office*